(12) United States Patent
Schuster et al.

(10) Patent No.: US 6,415,882 B1
(45) Date of Patent: Jul. 9, 2002

(54) DEPLOYABLE HINGE FOR PEDESTRIAN PROTECTION VEHICLE HOOD

(75) Inventors: Peter John Schuster, Leamington Spa (GB); Shah Iskander Farooq, Novi, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,986

(22) Filed: Nov. 5, 2001

(51) Int. Cl.[7] .............................................. B62D 25/12
(52) U.S. Cl. .................... 180/69.21; 180/274; 296/189; 16/223
(58) Field of Search ............................... 180/274, 281, 180/69.2, 69.21, 69.24; 296/194, 189; 16/222, 223

(56) References Cited

U.S. PATENT DOCUMENTS

| | | | |
|---|---|---|---|
| 4,015,870 A | | 4/1977 | Stcherbatcheff et al. |
| 4,069,550 A | * | 1/1978 | Silk et al. ..................... 16/361 |
| 4,125,170 A | * | 11/1978 | Botz ........................ 180/69.21 |
| 4,249,632 A | | 2/1981 | Lucchini et al. |
| 4,530,412 A | * | 7/1985 | Sigety, Jr. ................ 180/69.21 |
| 5,385,212 A | | 1/1995 | Cady et al. |
| 5,697,467 A | | 12/1997 | Howard |
| 5,934,743 A | | 8/1999 | Nohr et al. |
| 5,992,550 A | * | 11/1999 | Gronlund ................ 180/69.21 |
| 6,167,977 B1 | * | 1/2001 | Adamson et al. .......... 180/69.2 |
| 6,182,782 B1 | | 2/2001 | Matsuura et al. |
| 6,217,108 B1 | | 4/2001 | Sasaki |
| 6,237,992 B1 | | 5/2001 | Howard |

FOREIGN PATENT DOCUMENTS

| | | | |
|---|---|---|---|
| DE | 28 46 307 A1 | * | 4/1979 |
| EP | 0 317 745 A1 | * | 5/1989 |
| EP | 0 323 065 A1 | * | 7/1989 |
| JP | 4-81369 A | * | 3/1992 |
| JP | 5-85417 A | * | 4/1993 |

* cited by examiner

Primary Examiner—Paul N. Dickson
Assistant Examiner—Ruth Ilan
(74) Attorney, Agent, or Firm—Gary A. Smith

(57) ABSTRACT

A device for raising the hood of an automotive vehicle to increase the amount of space between the hood and underhood components to increase the energy absorbed by the hood during collision with a pedestrian. A pivot secured to the vehicle body structure engages a slot in a hinge secured to the hood. During normal vehicle operation, the pin is retained in a pin retention pocket at an upper end of the slot, and the slot narrows at a neck portion immediately below the pin retention pocket to prevent the hood from being lifted upwardly. A powered deployment cylinder is activated by a pedestrian impact detection system and urges the hood and the hinge upward relative to the body structure, the pivot sliding downward in the slot. The cylinder applies sufficient upward force to hood and/or hinge to force the pivot through the neck portion of the slot. When in the raised position, a larger diameter section of the pin engages the slot in an interference fit to provide resistance to movement of the hinge and hood downward toward the normal position.

12 Claims, 4 Drawing Sheets

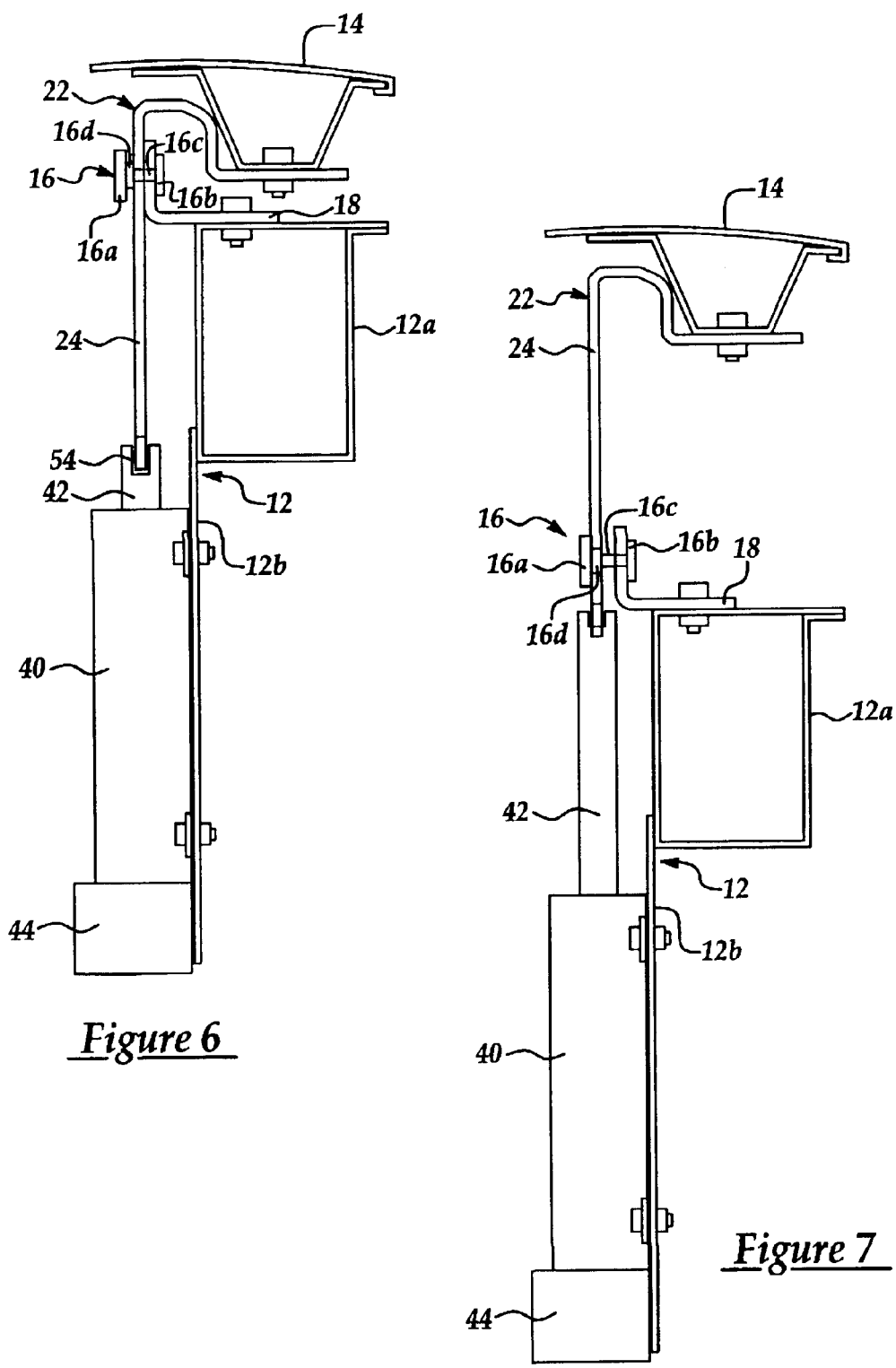

DEPLOYABLE HINGE FOR PEDESTRIAN PROTECTION VEHICLE HOOD

BACKGROUND OF INVENTION

The present invention relates generally to a vehicle hood that is deployable upwardly in response to the vehicle impacting a pedestrian to provide additional crush space between the hood and underhood components, and more specifically to a hinge permitting normal opening and closing of the hood prior to deployment and that securely restrains the hood against rearward movement when in the deployed condition.

In modern automotive design it is desirable for visibility, aerodynamic and styling reasons that the hood line be kept as low as possible. As a result, there is generally very little clearance between the hood and the engine bay contents of the automotive vehicle. As a result, the hood is unable to yield enough to provide significant cushioning when a pedestrian strikes the hood during an accident. Pedestrian safety performance can be improved by increasing the clearance between the hood and the vehicle components beneath the hood.

One way to achieve a greater clearance while maintaining a low hood line during normal vehicle operations is to provide a device to raise the hood in response to or immediately prior to the vehicle impacting a pedestrian.

U.S. Pat. No. 6,217,108 and U.S. Pat. No. 6,1 82,782 disclose systems for raising the trailing edge of a vehicle hood. These systems utilize complicated, multi-part hinge mechanisms that are relatively expensive to manufacture and complicated to install in a vehicle.

SUMMARY OF INVENTION

The present invention provides a hood deployment device for an automotive vehicle having a body structure and a hood with a trailing edge and a leading edge, the device comprising a pivot secured to the body structure and having a first section of a first diameter, and a hinge secured to the hood. A slot is formed in the hinge and comprises a pivot retention pocket at an upper end of the slot having a width larger than the pivot diameter, a neck portion immediately below the pivot retention pocket having a width smaller than the pivot diameter, and a slide portion below the neck portion having a width larger than the pivot diameter.

During normal vehicle operation, the pivot has a normal position wherein the pivot engages the pivot retention pocket to permit rotating movement of the hinge and the hood about the pivot in order to open and close the hood. The narrowing of the slot at the neck portion prevents the hood from being lifted upwardly.

The hood deployment device further comprises a powered device disposed on the body structure and operable to urge the hinge and the hood upward relative to the body structure to a raised position, the pivot sliding downward toward a bottom of the slot as the hinge moves to the raised position. The powered device is activated upon detection or prediction of a collision with a pedestrian, and applies sufficient upward force to hood and/or hinge to force the pivot through the neck portion of the slot, the hinge and/or pivot deforming to allow the pivot to pass through. When in the raised position, the engagement of the pivot with the bottom of the slot provides mechanical resistance to rearward movement of the hood, such as may be caused by the collision of the pedestrian with the hood. The device has a minimum number of moving parts and so is inexpensive to manufacture.

The invention hood deployment device is able to yield when in the deployed condition so as to absorb impact energy.

According to another feature of the invention, the slot further comprises an enlarged portion adjacent the bottom of the slide portion and of a width greater than the width of the slide portion, and the pivot further comprises an enlarged section axially adjacent to the first section. The enlarged section has a second diameter greater than the first diameter, smaller than the width of the enlarged portion, and greater than the width of the slide portion of the slot. When the hinge reaches the raised position the hinge is movable relative to the pivot in a lateral direction parallel to an axis of the pivot to place the enlarged section in engagement with the slot. The engagement between the enlarged section and the slide portion of the slot constitutes an interference fit that provides resistance to movement of the hinge and hood downward toward the normal position. The degree of resistance may be adjusted by proper selection of the second diameter relative to the width of the slide portion of the slot, so that movement of the hood downwardly from the raised position absorbs energy and so cushions the impact of the pedestrian with the hood.

Other features and advantages of the present invention will be readily appreciated and better understood after reading the subsequent description when considered in connection with the accompanying drawings.

BRIEF DESCRIPTION OF DRAWINGS

FIG. 6 is a front view of an alternative embodiment of the present invention in a normal operating condition.

FIG. 7 is a front view of the embodiment of FIG. 6 with the hood in a deployed or raised condition.

DETAILED DESCRIPTION

Figure 1:
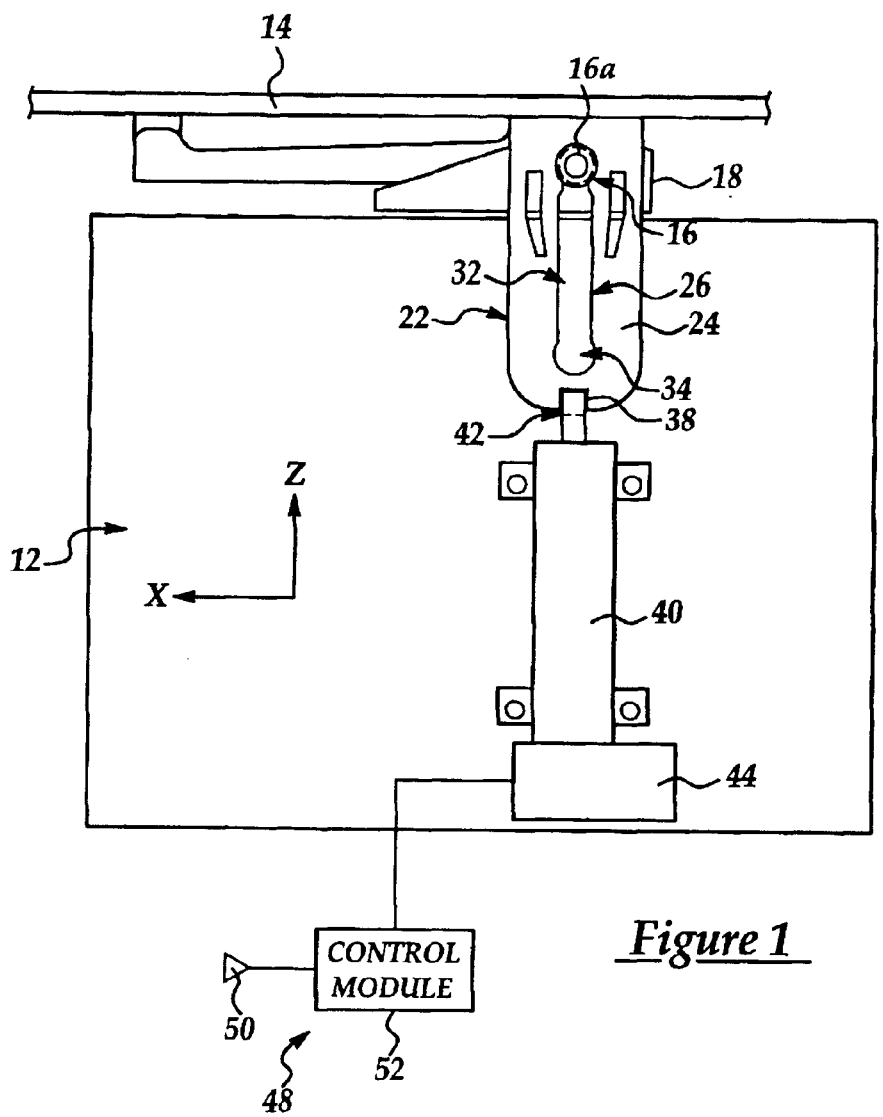
FIG. 1 is a side view of a hood deployment device according to the present invention in a normal operating condition with the hood in a closed position.
Figures 2, 5:
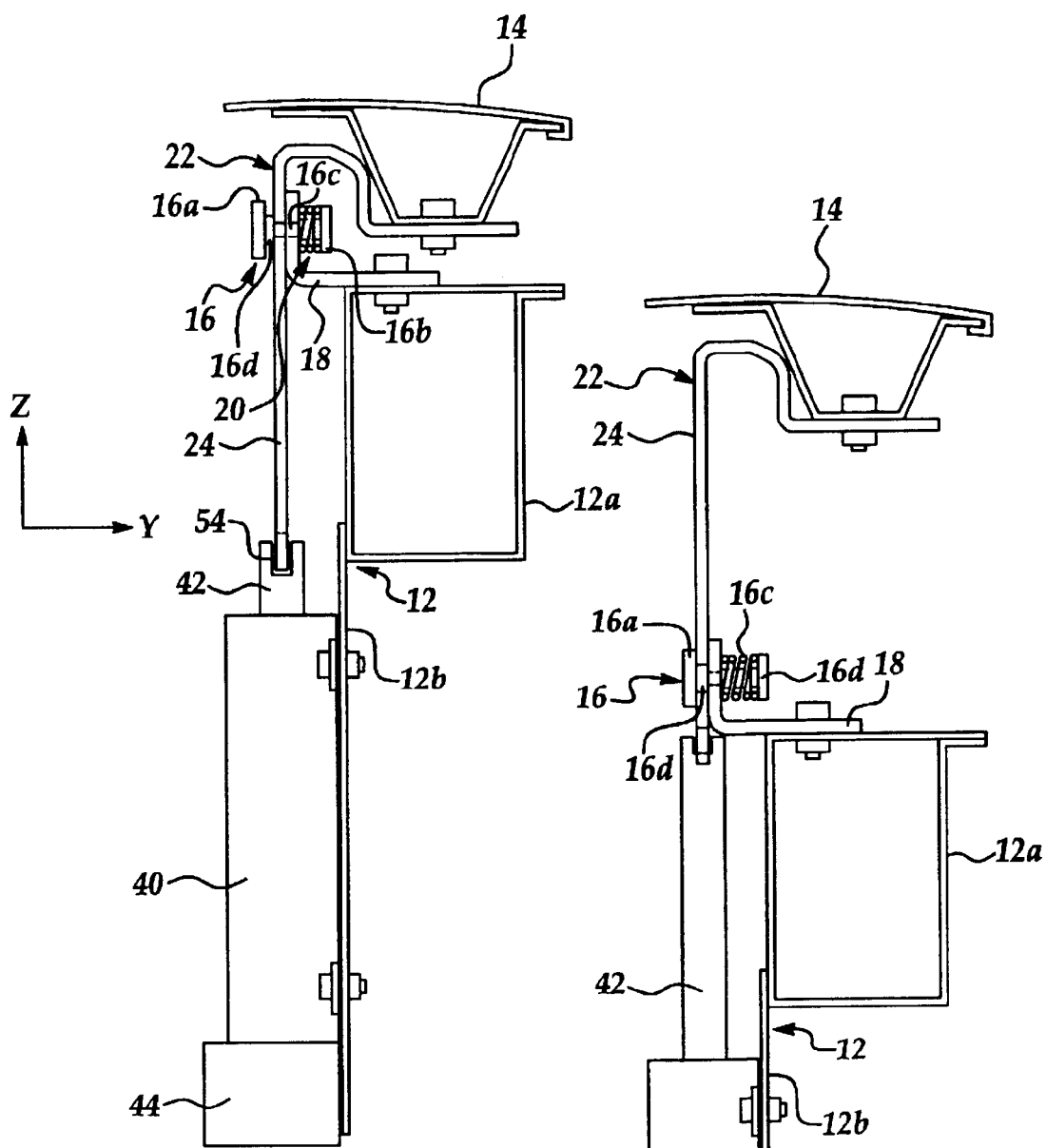
FIG. 2 is a front view of the device of FIG. 1.
FIG. 5 is a front view of the device of FIG. 1 with the hood in a deployed or raised condition.

Referring to FIGS. 1 and 2, a hood deployment device according to the present invention is shown in combination with a vehicle body structure, generally indicated at 12, and a hood 14. In the depicted embodiment, vehicle body structure 12 includes a shotgun having a rectangular cross-section 12a and a flat bodyside 12b, but this is by way of example only, as the invention may be practiced in relation to a vehicle having any type of body construction. While the following description is directed to a vehicle having a hood that is hinged at a trailing edge, the invention may also be applied to a hood hinged at its leading edge. All references to directions herein are relative to the vehicle as a whole and use the convention shown by the coordinate axes indicated in FIGS. 1 and 2, wherein the X-axis is the longitudinal axis of the vehicle, the Y-axis is the lateral axis, and the Z-axis is the vertical axis.

A pivot 16 is secured to the vehicle body structure 12 by a mounting bracket 18. Pivot 16 comprises two end caps 16a, 16b, a first section 16c having a first diameter, and a second section 16d having a second diameter greater than the first diameter. The axis of the pivot 16 is aligned with the lateral axis (Y-axis) of the vehicle. A coil spring 20 is mounted coaxially with pivot 16 between bracket 18 and end cap 16b.

Figure 3:
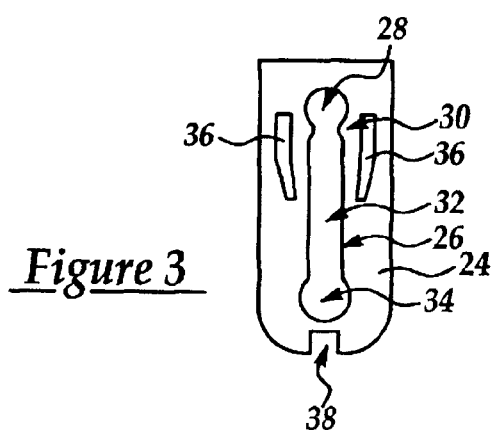
FIG. 3 is a detail view of a hinge according to the present invention.

A hinge 22 is secured to the hood 14 and comprises a plate 24 extending generally vertically downward and having an elongated slot 26 formed therein. As best seen in FIG. 3, slot 26 comprises a pin retention pocket 28 adjacent its upper end, a neck portion 30 immediately below the pin retention pocket, a slide portion 32 below the neck portion, and an enlarged portion 34 adjacent the bottom of the slide portion. The pin retention pocket 28 and the slide portion 32 are both of a width somewhat larger than the diameter of pivot first section 16c and smaller than the diameter of pivot second section 16d. The neck portion 30 is of a width somewhat less than the diameter of the pivot first section 16c. The enlarged portion 34 is of a width somewhat larger than the diameter of pivot second section 16d. Relief slots 36 are formed in plate 24 on either side of neck portion 30. An engagement notch 38 is formed in plate 24 at the extreme lower end thereof.

Figure 4:
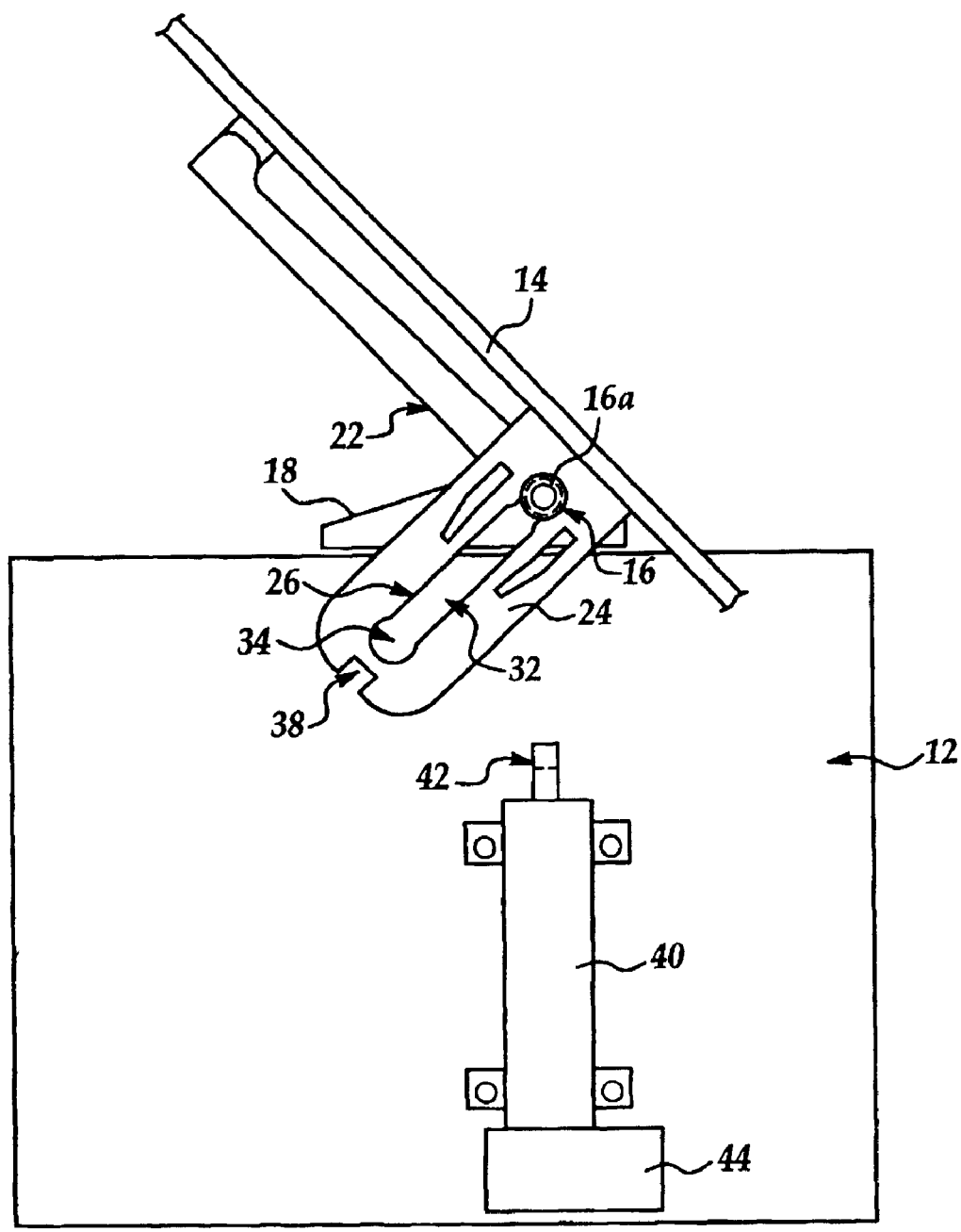
FIG. 4 is a side view of the device of FIG. 1 with the hood rotated to an open position.

During normal vehicle operating conditions, the pivot 16 is retained in pin retention pocket 28 so that hinge 22 and attached hood 14 may be rotated relative to vehicle body structure 12 between a closed position shown in FIGS. 1 and 2 and an open position shown in FIG. 4. The width of pin retention pocket 28 is sufficiently larger than the diameter of slot first section 16c to allow hinge 22 and hood 14 to rotate freely. The width of neck portion 30 is sufficiently smaller than slot first section 16c to retain the pivot 16 in pin retention pocket 28 and prevent the hinge 22 and hood trailing edge from being lifted relative to vehicle body structure 12 during normal vehicle operations. A deployment cylinder 40 is secured to vehicle body structure 12 immediately below hinge 22 and comprises a vertically movable piston 42 driven by a pyrotechnic charge 44. Deployment cylinder 40 is activated by a control system indicated schematically at 48 in FIG. 1. The control system 48 comprises a pedestrian impact sensor 50, which may detect physical impacts with the vehicle or may be a pre-impact detector utilizing, for example, radar, laser, sonar, optical, or any other appropriate remote detection means. A control module 52 receives signals from sensor 50, evaluates the signals, and activates deployment cylinder 40 when the signals indicate that the vehicle has struck or is about to strike a pedestrian.

The pyrotechnically actuated deployment cylinder 40 disclosed herein is but one possible means for urging hood 14 upward. Any appropriate powered device (mechanical, electrical, hydraulic, magnetic, pneumatic, etc.) that raises the hood to a deployed position in response to an actual or anticipated impact with a pedestrian is within the scope of this invention. The powered device need not act directly on the hinge 22, but rather may act on the hood 14, the hinge 22, and/or any related structure. The powered device may be attached to any portion of the vehicle body structure 12 in the vicinity of the hood 14 as may be desired for packaging reasons. For example, the powered device may be attached between a fender and an A-pillar of the vehicle, or adjacent the outer surface of the shotgun and/or bodyside.

The upper end of the piston 42 is formed with an engagement slot 54 (see FIG. 2) aligned with the longitudinal axis (X-axis) of the vehicle. Engagement slot 54 is positioned in vertical alignment with engagement notch 38, with the bottom of the slot 54 being lower than the lowest extent of plate 24 so that there is clearance between the two components during normal operating conditions and the hood 14 may be freely rotated between open and closed positions.

When control system 48 detects an actual or impending impact with a pedestrian (not shown), deployment cylinder 40 is activated to extend piston 42 from the retracted position to the extended position, thereby urging hinge 22 and hood 14 upwardly to the raised position shown in FIG. 5. Upward movement of hinge 22 forces pivot 16 through neck portion 30 of slot 26, the plate 24 deforming somewhat in the vicinity of the neck portion 30 to permit passage of pivot 16 through to the slide portion 32. Relief slots 36 allow plate 24 to deform as necessary. As piston 42 is extended, engagement slot 54 engages engagement notch 38 to form a positive engagement between the piston 42 and the plate 24.

In the raised position, hood 14 is spaced from vehicle components (not shown) in the engine compartment to provide space for the hood to deflect downward when struck by the pedestrian. The engagement between hinge 22 and pivot 16 provides resistance to rearward movement of hood 14, such as may tend to be caused by impact of the pedestrian with the hood, so that the hood is not forced into the vehicle windshield (not shown).

Movement of hood 14 to the raised position may entail a pivoting motion about a lateral axis adjacent the leading edge of the hood. Such a pivot axis may be provided by a latch mechanism that during normal operation serves to keep the hood 14 closed. Alternatively, leading edge of hood 14 may be provided with a mechanism allowing it to deploy upwardly in a pedestrian impact.

When hood 14 reaches the raised position, pivot 16 is at the bottom of slot 26 and in alignment with the enlarged portion 34 of slot 26. As seen in FIG. 5, coil spring 20 is then able to urge pivot 16 along the Y-axis so that second section 16d of the pivot is inserted into the slot 26. When pivot second section 16d is engaged with slot 26, an interference fit is present between the pin and slide portion 32 of slot 26 so as to provide resistance to downward movement of hood 14. The amount of this resistance may be tuned by proper selection of the relative dimensions, materials, and other characteristics of the components involved in order to provide controlled downward movement of the hood 14 when impacted by the pedestrian, thereby providing additional absorption of the impact energy.

As an alternative to moving pivot 16 axially to place the second section 16d of the pin in engagement with slot 26, it is possible to keep pivot 16 fixed and move the plate 24 in a lateral direction. In the alternative embodiment shown in FIGS. 6 and 7, this is achieved by installing plate 24 such that it is in an elastically deflected condition when in the normal operating condition of FIG. 6. Only when hinge 22 reaches the raised position and enlarged portion 34 of slot 26 is aligned with pivot 16 is plate 24 able to return to its undeflected condition, moving laterally to place the pivot second section 16d in engagement with the slot 26, as shown in FIG. 7.

It is also within the scope of the present invention to utilize the pressure within the deployed deployment cylinder 40 to lock hood 14 in the raised condition and/or to allow downward movement of the hood in a controlled manner to absorb impact energy. This may be accomplished by designing deployment cylinder 40 to have a proper internal pressure after deployment and/or by providing a controlled venting of pressure from the deployed cylinder. The deployment cylinder may be used as an alternative to the interference between slot 26 and pivot 16 as a means to absorb impact energy, or the two features may be used in combination.

Because the deployment cylinder 40 is mechanically isolated from the hinge mechanism during normal opening and closing of the hood, the cylinder need not be designed to contend with durability, cycling, and fatigue requirements related to normal operation of the hood. Therefore, the cylinder may be optimally designed and tuned for proper deployment of the hood.

While the best modes for carrying out the invention have been described in detail, those familiar with the art to which this invention relates will recognize various alternative designs and embodiments for practicing the invention as defined by the appended claims.

What is claimed is:

1. A hood deployment device for an automotive vehicle having a body structure and a hood, the hood deployment device comprising:

a pivot secured to the body structure and having a first section of a first diameter;

a hinge secured to the hood and having a slot formed therein, the slot comprising a pivot retention pocket at an upper end of the slot having a width larger than the first diameter, a neck portion immediately below the pivot retention pocket having a width smaller than the first diameter, and a slide portion below the neck portion having a width larger than the first diameter, the deployment device having a normal position wherein the first section of the pivot engages the pivot retention pocket to permit rotating movement of the hinge and the hood about the pivot; and a powered device disposed on the body structure and operable to urge the hood and the hinge upward relative to the body structure to a raised position wherein the pivot is adjacent a bottom of the slot.

2. The apparatus according to claim 1 wherein:

the slot further comprises an enlarged portion adjacent the bottom of the slide portion and of a width greater than the width of the slide portion; and the pivot further comprises a second section axially adjacent to the first section and of a second diameter greater than the first diameter, smaller than the width of the enlarged portion, and greater than the width of the slide portion of the slot, whereby when the hinge reaches the raised position at least one of the hinge and the pivot is movable in a direction parallel to an axis of the pivot to place the second section in engagement with the slot, engagement between the second section and the slide portion of the slot providing resistance to movement of the hinge toward the normal position.

3. The apparatus according to claim 2 wherein the hinge is in an elastically deflected condition when engaged with the first diameter and returns to an undeflected condition when the hood reaches the raised position, said return placing the second section in engagement with the slot.

4. The apparatus according to claim 2 wherein the pivot is in a first position when the first section is engaged with the slot and is axially movable to a second position to place the second section in engagement with the slot.

5. The apparatus according to claim 1 wherein the powered device comprises a deployment cylinder connected to the body structure and having a piston movable between a retracted condition wherein the piston permits the hinge to remain in the normal position and an extended condition wherein the piston urges the hood to the raised position.

6. The apparatus according to claim 5 wherein the piston contacts the hinge to urge the hood to the raised position.

7. The apparatus according to claim 6 wherein a first feature is disposed on an upper end of the piston and a second feature is disposed on the hinge at a point where the piston contacts the hinge, the first and second features entering into mating engagement with one another when the piston contacts the hinge.

8. The apparatus according to claim 1 wherein the hinge further comprises at least one relief slot disposed adjacent the neck portion.

9. The apparatus according to claim 1 wherein the powered device comprises a deployment cylinder having a pyrotechnically actuated piston.

10. The apparatus according to claim 1 wherein the powered device is further operative to provide resistance to movement of the hinge from the raised position toward the normal position.

11. A method of moving a hood of an automotive vehicle relative to a body structure of the automotive vehicle from a normal position to a raised position, the method comprising the steps of:

providing a pivot secured to the body structure and having a first section of a first diameter;

providing a hinge secured to the hood and having a slot formed therein, the slot comprising a pivot retention pocket at an upper end of the slot having a width larger than the first diameter, a neck portion immediately below the pivot retention pocket having a width smaller than the first diameter, and a slide portion below the neck portion having a width larger than the first diameter, the first section of the pivot engaging the pivot retention pocket when the hood is in the normal position to permit rotating movement of the hinge and the hood about the pivot; and actuating a powered device disposed on the body structure to urge the hood and the hinge upward relative to the body structure and the pivot to the raised position, the pivot being adjacent a bottom of the slide portion of the slot when the hood and the hinge are in the raised position.

12. The method according to claim 11 further comprising the step of using the powered device to provide resistance to movement of the hinge from the raised position toward the normal position.

* * * * *